UNITED STATES PATENT OFFICE.

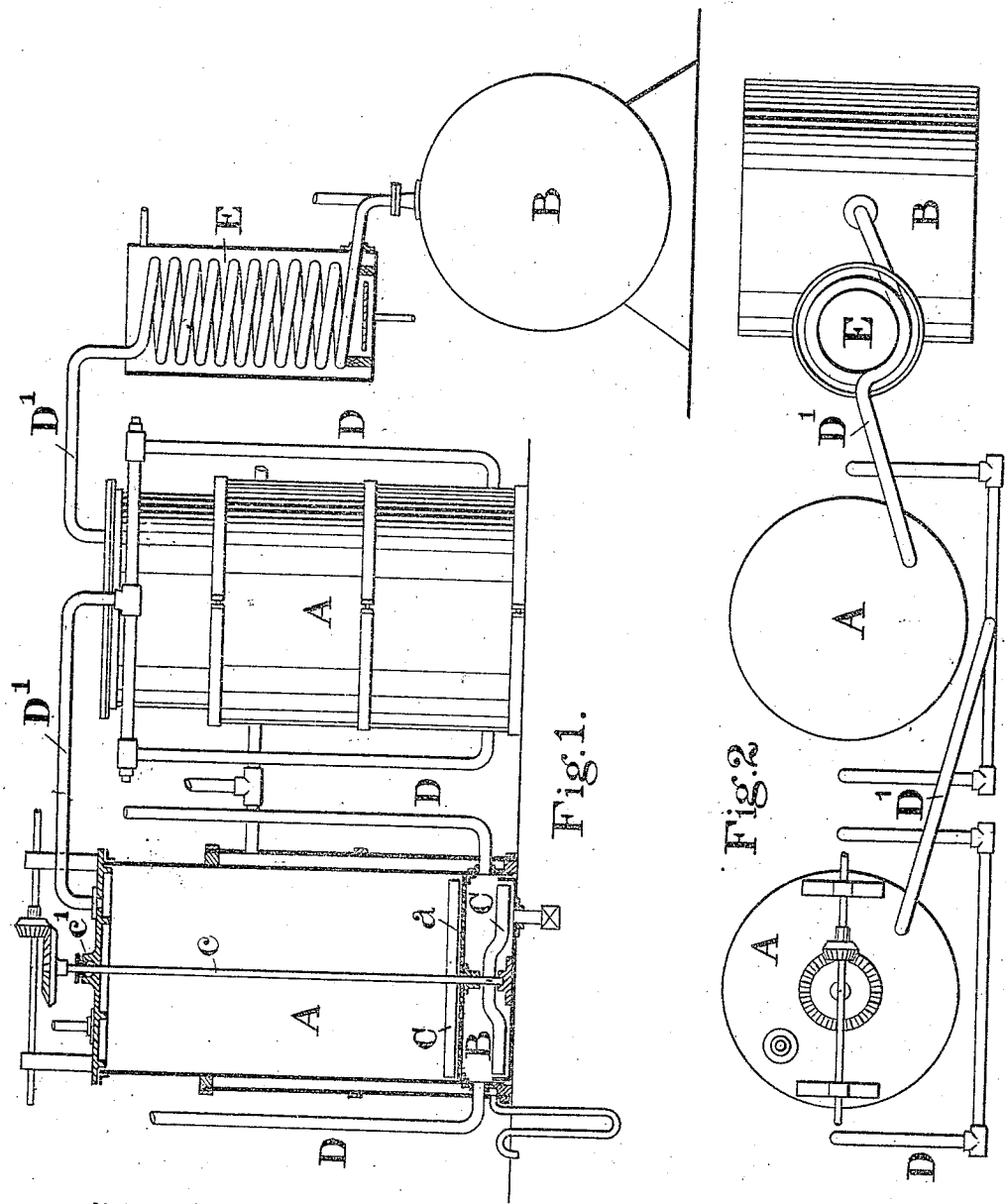

JOHN GILL, OF PENDLETON, ENGLAND.

MANUFACTURE OF FERRIC OXID.

1,008,321.  Specification of Letters Patent.  Patented Nov. 14, 1911.

Application filed January 12, 1910. Serial No. 537,753.

*To all whom it may concern:*

Be it known that I, JOHN GILL, a British subject, residing at Pendleton, county of Lancaster, England, have invented certain new and useful Improvements in the Manufacture of Ferric Oxid, of which the following is a specification.

My invention is based on the fact that calcium carbonate $CaCO_3$ can be changed into a soluble calcium bicarbonate $Ca(HCO3)_2$ and in the presence of a solution of ferrous chlorid precipitates the iron contained in the liquor as ferrous carbonate which is capable of being oxidized into ferric hydrate.

The invention consists essentially in treating waste or other liquors containing ferrous chlorid $FeCl_2$ with carbonate of lime and carbon dioxid $CO_2$ and air to precipitate ferrous carbonate $FeCO_3$ and oxidize the precipitate into ferric hydrate $Fe_2(OH)_6$ and subsequently calcining the ferric hydrate to drive off the water and obtain a pure or high class oxid of iron $Fe_2O_3$.

The invention will be fully described with reference to the accompanying drawings forming part of the specification which as an example show a diagrammatic elevation Figure 1. and plan Fig. 2 of plant suitable for carrying out the process.

In carrying out the invention I take galvanizers or wire drawers waste liquor or other liquor containing ferrous chlorid, $FeCl_2$ and in a suitable tank or vessel mix therewith a quantity of calcium carbonate $CaCO_3$ the proportion of the latter being determined by the strength of the solution or the amount of the iron contained in the chlorid. To an average sample of 60° Tw. I add 30 lbs of carbonate of lime. The mixed liquor is run into a suitably constructed decomposer and oxidizer and a mixture of air and carbonic acid gas $CO_2$ is blown through it until nearly all the iron is precipitated the liquor during the process being maintained at a high temperature about 180° F and the time taken averaging about 4 hours.

The decomposer and oxidizer comprises a closed steam jacketed pan A with a perforated false bottom $a$ and a generator B for carbon-dioxid from which air and $CO_2$ are blown into the pan A through the bottom $a$ by an air compressor. An agitator C is placed in the pan A to keep the mixture in a state of agitation during the process of oxidation. The agitator shaft $c$ passes through an air tight gland $c'$ in the cover of the pan and is rotated by any suitable mechanism. An inlet pipe D is fitted to the pan below the false bottom and an outlet pipe D' into the top of the pan and through the latter the spirit, air and gas pass to a condenser E where any steam or vapor they may contain is condensed. The condenser E is connected to the gas generator and air chamber B from which the $CO_2$ and air are forced to the inlet pipe D, and again through the mixture of bicarbonate of lime and iron chlorid in the pan A.

Two or more pans or vessels A may be connected in series as shown and the air and carbonic acid gas forced through them in succession, a condenser being placed between the pans if found desirable. The carbonic acid gas $CO_2$ and air are forced through under pressure; and form with the water in the solution carbonic acid $(H_2CO_3)$ which decomposes the calcium carbonate $CaCO_3$ forming bicarbonate of lime $(Ca(HCO_3)_2)$. The solution of calcium bicarbonate being in a solution of ferrous chlorid $FeCl_2$ at once precipitates the iron as carbonate of iron $FeCO_3$ with the splitting up of carbonic acid gas and water, the nascent $CO_2$ again forming $H_2CO_3$ which in turn decomposes the lime precipitating more iron and so on until the operation is completed. The ferrous carbonate $FeCO$ thus formed oxidizes into ferric hydrate $Fe_2(OH)_6$ owing to the presence of the air which is being blown through the mixture, the process of oxidation being quickened by being heated up with steam to about 180° F.

Instead of mixing the liquor containing the ferrous chlorid $FeCl_2$ with the calcium carbonate $CaCO_3$ the process may be carried on by separate operations by pumping carbon dioxid $CO_2$ into water under pressure forming carbonic acid $H_2CO_3$ and then adding the carbonate of lime $CaCO_3$ producing a solution of $Ca(HCO_3)$ which is run into a pan or vessel containing the ferrous chlorid solution or liquor when a precipitation of ferrous carbonate $FeCO_3$ takes place after which atmospheric air is blown through to produce the ferric hydrate $Fe_2(OH)_6$.

The following are the reactions:

$$CaCO_3 + H_2O + CO_2 = Ca(HCO_3)_2$$
$$FeCl_2 + Ca(HCO_3)_2 = FeCO_3(H_2O) + CaCl_2$$
$$FeCO_3 + H_2O + O = Fe_2(OH)_6 + CO_2$$

Calcination of $Fe_2(OH)_6$ produces $Fe_2O_3 + 3(H_2O)$.

Most chlorid liquors contain manganese as manganese chlorid and during the process some of this is oxidized to manganese oxid which if allowed to remain in the hydrate of iron and calcined would have a deleterious effect on the resulting oxid giving it a brownish tint and consequently lowering its value as a pigment. To obviate this I treat the finished hydrates with hydrochloric acid which decomposes any manganese which may be present into manganese chlorid. After settling the manganese chlorids are decanted off to be further treated for the manufacture of siennas and umbers. I thus obtain a practically pure ferric hydrate $Fe_2(OH)_6$ which after washing to remove all soluble salts is filtered, dried and calcined in a suitable furnace resulting in the production of a high class or practically pure ferric oxid $Fe_2O_3$ of from 97% to 98%.

By increasing the temperature of the mixture of ferrous chlorid liquor and carbonate of lime and at the same time forcing air through the mixture I form magnetic oxid of iron $(Fe_3O_4)$. This is washed to free it from soluble salts—is then filtered and calcined.

By this process I claim an additional advantage to the present process of making red oxid from ferric hydrate—as I have no combined water of hydration to drive off, to do which requires about 5 hours in a furnace at a temperature of about 2000° Far. By my process I get the same results in 2 hours at a temperature of 800° Far.

I do not confine myself to work at one temperature in the oxidation process, as by varying the temperatures I obtain precipitates, which when calcined will give shades of oxid of iron ranging from crimson red to deep Indian red. The higher the temperature during the process of oxidation, the deeper the resultant shade of oxid will be when calcined.

What I claim as my invention and desire to protect by Letters Patent is:—

1. The process of preparing ferric hydrate $Fe_2(OH)_6$ by treating ferrous chlorid $FeCl_2$ with calcium carbonate $CaCO_3$ and subsequently forcing carbon dioxid $CO_2$ and air therethrough substantially as described.

2. The process of preparing ferric oxid $Fe_2O_3$ which consists in treating a waste or other liquor containing a solution of ferrous chlorid $FeCl_2$ with calcium carbonate $CaCO_3$ and blowing carbon dioxid $CO_2$ and air therethrough to precipitate ferrous carbonate $FeCO_3$ and oxidize the latter into ferric hydrate $Fe_2(OH)_6$ and subsequently calcining the ferric hydrate to drive off the water substantially as described.

In testimony whereof I have hereunto set my hand in presence of two subscribing witnesses.

JOHN GILL.

Witnesses:
I. OWDEN O'BRIEN,
HARRY BARNFATHER.